UNITED STATES PATENT OFFICE.

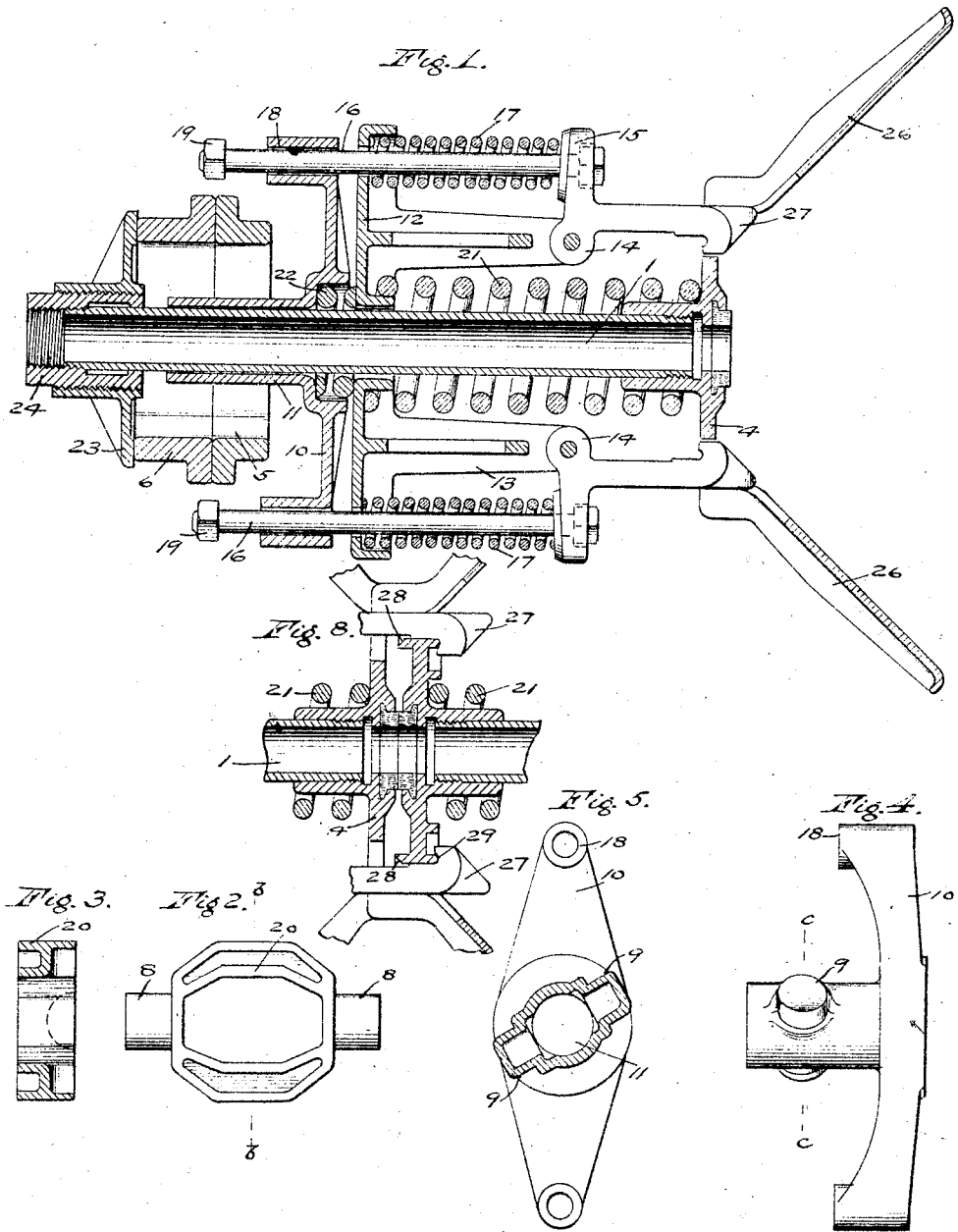

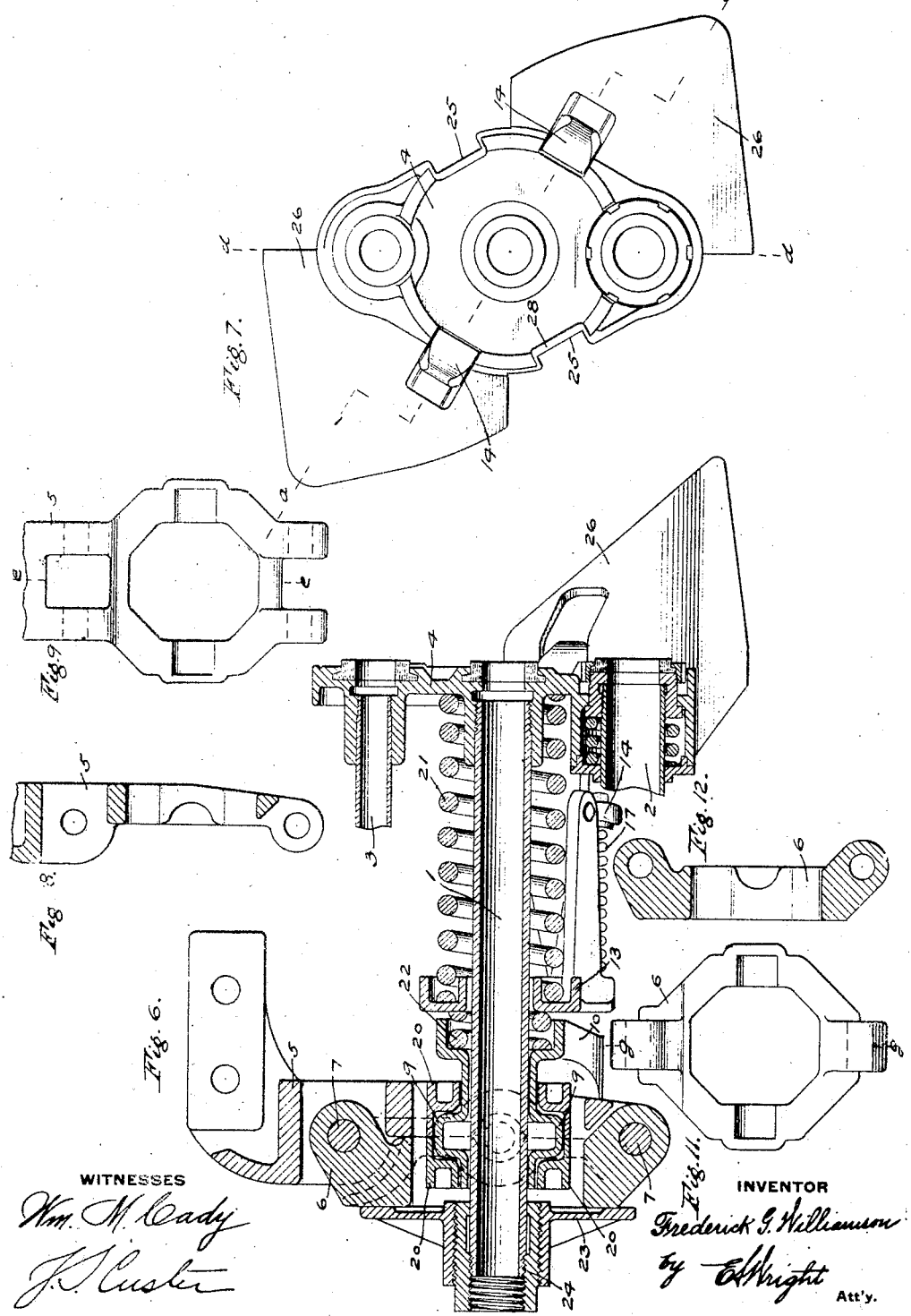

FREDERICK G. WILLIAMSON, OF ST. LOUIS, MISSOURI, ASSIGNOR TO WESTINGHOUSE AUTOMATIC AIR & STEAM COUPLER COMPANY, OF EAST ST. LOUIS, ILLINOIS, A CORPORATION OF ILLINOIS.

AUTOMATIC PIPE-COUPLING.

1,005,092. Specification of Letters Patent. Patented Oct. 3, 1911.

Application filed December 4, 1909. Serial No. 531,337.

*To all whom it may concern:*

Be it known that I, FREDERICK G. WILLIAMSON, a citizen of the United States, residing at St. Louis, in the State of Missouri, have invented new and useful Improvements in Automatic Pipe-Couplings, of which the following is a specification.

This invention relates to automatic couplings for railway train pipes and more particularly to a coupling of the butt type.

One object of my invention is to provide a coupling of the above type in which the coupling hangers shall be free of pressure from the buffer springs in the coupled position.

Another object of my invention is to provide a coupling of this type having means for holding the coupling heads together with a substantially constant pressure regardless of the running in and out of the drawbar slack or other causes.

Still another object is to provide means whereby a defective coupling head may be removed while the cars are coupled up.

In the accompanying drawings; Figure 1 is a section, taken on line a—a of Fig. 7, of a butt type coupling head embodying my improvement; Fig. 2 an elevational view of a detail of the coupling head; Fig. 3 a section on the line b—b of Fig. 2; Fig. 4 an elevational view of another detail of the coupling head; Fig. 5 a section thereof on the line c—c of Fig. 4; Fig. 6 a section of line d—d of Fig. 7; Fig. 7 a face view of the coupling head; Fig. 8 a sectional view taken on the same plane as Fig. 1, but showing two coupling heads coupled together; Fig. 9 a face view of the fixed hanger plate; Fig. 10 a sectional view thereof on the line e—e of Fig. 9; Fig. 11 a face view of the removable hanger plate; and Fig. 12 a sectional view thereof on the line g—g of Fig. 11.

The coupling head may be provided with one or more conduits, the construction illustrated having a brake pipe conduit 1, steam conduit 2, and signal pipe conduit 3, provided at the face of the coupling head with the usual gaskets carried in a head casting 4.

The coupling head hanger comprises a fixed hanger member 5 adapted to be secured to the car coupler head and a removable hanger plate 6 secured to the member 5 by means of pins 7. Intermediate the pins 7, the hanger member 5 and the removable plate 6 are provided with half bearings for the trunnions 8 of a coupling head support consisting of half sections 20, such as shown in Figs. 2 and 3. The half sections 20 when in position, form bearings for trunnions 9 of a casting 10, the latter bearings being disposed at an angle of 90 degrees with respect to the trunnion bearings in the hanger members so that the casting 10 may have a universal movement in the coupling hanger. The casting 10 is provided centrally with a long bearing 11 within which the brake pipe conduit 1 is loosely carried.

Mounted outwardly of the casting 10 is a member 12 provided with outwardly extending arms 13 adapted to carry on their extreme ends pivotally mounted locking hooks 14 having a vertical arm 15 through which a bolt 16 passes, a coil spring 17 being interposed between the arm 15 and the member 12. The bolt 16 also extends through an opening 18 in the casting 10 and is provided on the adjacent end with an adjustable nut 19. Intermediate the head casting 4 and the member 12 is a buffer spring 21 and between the member 12 and the casting 10 is a coil spring 22 adapted to normally maintain a clearance space between said parts. Rearward of the removable hanger plate 6 is a plate 23 having screw threaded engagement with a bushing 24 secured to the conduit 1. The plate 23 is adjusted so as to bear against the hanger plate 6, said plate 23 being screwed up sufficiently to slightly compress the buffer spring 21, so that normally the coupling head is yieldingly maintained in a horizontal position by the spring while permitting such movement of the head as may be necessary to bring the counterpart heads into proper alinement in the act of coupling.

As shown in Fig. 7, the locking hooks 14 are carried by the member 12 at an angle intermediate the vertical plane and the horizontal plane of the coupling head and notches 25 are provided in the head 4 in corresponding positions in the opposite quadrants, so that in coupling the locking hooks of one head will engage with the notches of the other head. The coupling head is further provided with flaring wings or plates 26 to assist in gathering the heads and guiding the same into the proper position for coupling.

The coupling parts are assembled by placing the half sections 20 together with the trunnions 9 of the casting 10 interposed in the intermediate bearings and mounting the half sections in the trunnion bearings of the fixed hanger member 5. The removable hanger plate 6 is then applied and the pins 7 inserted, to secure the parts together. The member 12 carrying the locking hooks 14 is then mounted on the conduit 1 with the buffer spring 21 interposed between the head casting 4 and said member and the conduit is positioned in the bearing 11 of the casting 10. The plate 23 is now screwed onto the bushing 24 and brought up so as to bear against the removable hanger plate 6 and compress the buffer spring 21.

In operation, when counterpart coupling heads are brought together, the wings 26 guide the heads into proper alinement, the heads automatically adjusting themselves to alinement, if necessary, through the action of the universal trunnion support. Upon engagement of the conduit gaskets, further movement of the cars causes the buffer springs 21 to be compressed, permitting the locking hooks 14 to move out relatively to the coupling heads. The hooks 14 are provided with inclined guiding flanges 27 which are adapted to engage and ride up over corresponding inclined faces 28 on the forward portion of the notches 25 of the head casting 4 and finally the hooks drop over lips 29 formed on the rearward portion of said notches, the hooks 14 having recesses within which the lips 29 are adapted to engage. The heads are now coupled up as shown in Fig. 8 and the conduit gaskets are firmly held together by the hooks 14 regardless of any action of the cars tending to separate the gaskets, such as produced in going around curves, for example. As the draw bar slack is pulled out by the running of the cars, the plate 23, which was moved to the rear and away from the removable hanger plate 6 by the compression of the buffer spring 21 in coupling, is pulled forward, but it will be noted that the compressive force of the buffer spring 21 does not act on the hanger, the opposite buffer springs of the coupled heads being confined between the member 12 and the head casting 4 and prevented from expanding by the locking of the hooks 14 on the opposing coupling head. The hangers are therefore freely movable relatively to the coupling heads during the ordinary buffing and pulling movements of the cars in running. When the cars are uncoupled, the hanger carries the casting 10 rearwardly and the bearings 18 thereof engage the nuts 19 of the bolts 16. Further separation of the cars then operates to exert a pull on the bolts 16, thereby lifting the hooks 14 through the rocking of the arms 15 and disengaging the coupling heads, so that the parts resume their normal positions. The coil spring 22 interposed between the casting 10 and the member 12 permits of a certain amount of yielding adjustment of the plate 12 where necessary.

If it is desired to remove a coupling head which is defective, with the cars coupled up, the plate 23 of each head is screwed forward to relieve the hooks 14 of the pressure of the buffer springs, and the nuts 19 are screwed up, so as to lift the hooks 14 out of engagement with the opposite coupling head. By screwing up the plates 23 the pressure on the pin 7 is relieved, so that said pins may be readily taken out and the defective head removed without difficulty.

Having now described my invention, what I claim as new and desire to secure by Letters Patent, is:—

1. In an automatic pipe coupling, the combination with a coupling head having a gasket adapted to make a butt joint with a counterpart head and a spring acting to extend said head, of means adapted to permit the suspension of the coupled heads free from the pressure of said spring.

2. In an automatic pipe coupling, the combination with a coupling head having a gasket adapted to make a butt joint with a counterpart head, a hanger for supporting said head, and a spring acting to extend said head, of means for freeing the hanger from the pressure of said spring when the heads are in the coupled position.

3. In an automatic pipe coupling, the combination with a coupling head having a gasket adapted to make a butt joint with a counterpart head, a hanger for supporting said head, and a spring acting between the hanger and head for extending the head, of means for relieving the hanger of the pressure of the spring when pulling strains are exerted with the heads coupled up.

4. In an automatic pipe coupling, the combination with a coupling head having a gasket adapted to make a butt joint with a counterpart head, a hanger for supporting said head, and a spring acting between the hanger and head for extending the head, of means for preventing the retractive action of the spring when the coupled cars are subjected to pulling strains.

5. In an automatic pipe coupling, the combination with a coupling head having a gasket adapted to make a butt joint with a counterpart head, a hanger for supporting said head, and a spring acting between the hanger and head for extending the head, of means for freeing the hanger of the retractive action of the spring in coupled position, when the draw-bar slack is pulled out in running.

6. In an automatic pipe coupling, the combination with a coupling head having a gasket adapted to make a butt joint with a counterpart head and a spring acting to extend said head, of a locking device for maintaining said head in engagement with a counterpart head in the coupled position, said spring being held under compression between the locking device and coupling head to thereby permit the free suspension of the heads in running.

7. In an automatic pipe coupling, the combination with a coupling head having a gasket adapted to make a butt joint with a counterpart head, of a hanger for supporting said head, a spring intermediate the hanger and head and adapted to be compressed upon coupling adjacent cars, and a locking device for engaging the counterpart head and adapted to confine said spring under compression, thereby freeing said hanger of the pressure of said spring when the draw-bar slack is pulled out in running.

8. In an automatic pipe coupling, the combination with a coupling head having a gasket adapted to make a butt joint with a counterpart head, of means for maintaining coupled heads under a substantially constant pressure regardless of the running in and running out of the draw-bar slack.

9. In an automatic pipe coupling, the combination with a coupling head having a gasket adapted to make a butt joint with a counterpart head, of a spring for extending said head and means for maintaining the spring under a substantially constant pressure against the head regardless of the running in and running out of the draw-bar slack.

10. In an automatic pipe coupling, the combination with a coupling head having a gasket adapted to make a butt joint with a counterpart head, of a spring for extending said head and means for locking the head to a counterpart head and for confining the spring under a constant compression free from action of the draw-bar slack in running in and running out.

11. In an automatic pipe coupling, the combination with a coupling head having a gasket adapted to make a butt joint with a counterpart head and a spring acting to extend said head, of means adapted to be operated manually in the coupled position for taking up the tension of the spring to thereby relieve the counterpart head of the pressure of said spring and permit the removal of a coupling head.

12. In an automatic pipe coupling, the combination with a coupling head having a gasket adapted to make a butt joint with a counterpart head and a spring acting to extend said head, of manually operated means for taking up said spring to relieve the counterpart head of the pressure of the spring in the coupled position, a locking device for clamping said head to the counterpart head and manually operated means for disengaging said locking device from the counterpart head in the coupled position to permit the removal of a coupling head.

13. In an automatic pipe coupling, the combination with a coupling head having a gasket adapted to make a butt joint with a counterpart head and a spring acting to extend said head, of a locking device for clamping said head to a counterpart head and means adapted to be operated manually in the coupled position for taking up the tension of the spring to relieve the counterpart coupling head of pressure.

In testimony whereof I have hereunto set my hand.

FREDERICK G. WILLIAMSON.

Witnesses:
  N. F. NIEDERLANDER,
  R. E. ADREAN.